S. SWEET, Jr.
PROCESS OF PURIFYING AND IMPROVING THE QUALITY OF DISTILLED SPIRITS.
No. 172,283.      Patented Jan. 18, 1876.
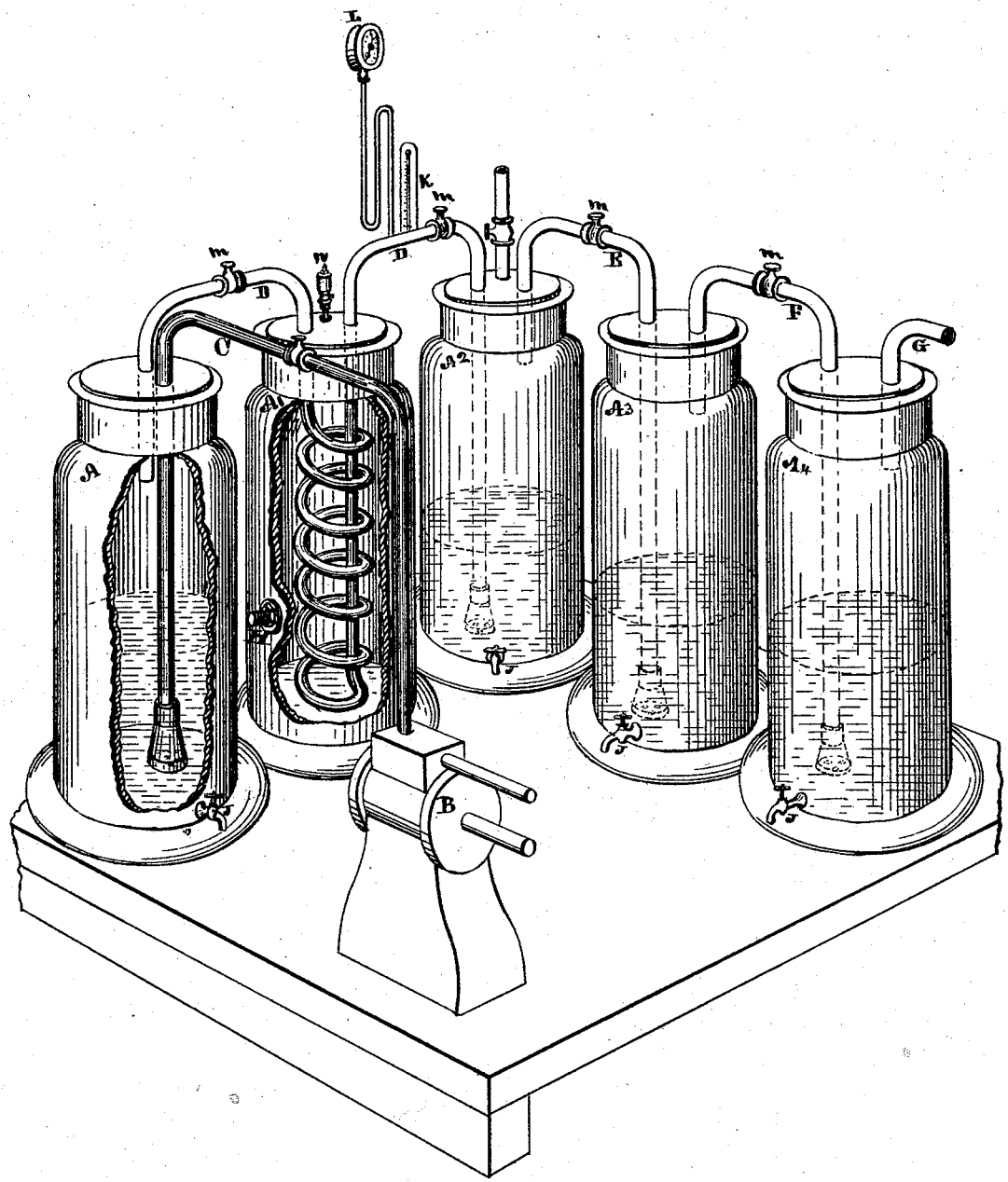

UNITED STATES PATENT OFFICE.

SULLIVAN SWEET, JR., OF BOSTON, ASSIGNOR TO AMOS L. WOOD, TRUSTEE, OF BROOKLINE, MASSACHUSETTS.

IMPROVEMENT IN PROCESSES OF PURIFYING AND IMPROVING THE QUALITY OF DISTILLED SPIRITS.

Specification forming part of Letters Patent No. 172,283, dated January 18, 1876; application filed May 7, 1875.

*To all whom it may concern:*

Be it known that I, SULLIVAN SWEET, Jr., of Boston, in the Commonwealth of Massachusetts, have invented an Improvement in the Process of Purifying and Improving the Quality of Distilled Spirits, and the apparatus used therefor, of which the following is a specification:

The object of this invention is to purify and give to newly-distilled spirits the qualities which heretofore have only been attained by long keeping, or by transportation in vessels making long voyages at sea.

The apparatus I use for this purpose is shown in the drawing herewith.

A, $A^1$, $A^2$, $A^3$, and $A^4$ are close tanks of suitable material, preferably copper, and of a capacity adapted to the amount of spirits to be treated; two feet in diameter and about six feet high would be a good proportion of size. B is an air-pump, to be driven by steam or other suitable power, and of a capacity adapted to the size of the tanks and their connecting-pipes. C is a pipe leading from the air-pump into and terminating with a perforated enlargement near the bottom of the tank A. D is a pipe from the top of the tank A into the top of tank $A^1$; thence in a coil to the bottom of said tank; thence upward through the top of said tank into and terminating with a perforated enlargement near the bottom of the tank $A^2$. E is a pipe from the top of the tank $A^2$ into and terminating with a perforated enlargement near the bottom of the tank $A^3$. F is a pipe from the top of the tank $A^3$ into and terminating with a perforated enlargement near the bottom of the tank $A^4$. G is a pipe from the top of the tank $A^4$, opening into the atmosphere at any convenient distance from the tank, for the egress of the air after it has passed through the several tanks mentioned. H is opening in the tank $A^1$, with a connection for attaching a steam-pipe, for the purpose of introducing steam into that tank to warm the air in the pipe D. J J J J are faucets for draining the several tanks when desirable. K is a thermometer, with the bulb within the pipe D. L is a pressure-gage. M M M M are check-valves or stops, allowing the passage of air from the air-pump through the several tanks, but preventing a return current. N is a safety-valve.

The tank A is partly filled with water, say about two-thirds full. The tank $A^1$ contains no water or other liquid, but only the coil of the pipe D, and is intended to receive steam through the opening H, for the purpose of warming the air passing through the coil in it. The tank $A^2$ contains the spirits to be treated, being filled from half to two-thirds full. The tanks $A^3$ and $A^4$ are filled from half to two-thirds full of water.

The air-pump is put in motion and a sufficient amount of steam admitted to the tank $A^1$ to heat the air in the coil-tube D, so as to raise the mercury in the thermometer to about 140°. The air being forced through the pipe C is disseminated through the bottom of the water in the tank A, rising through it into the open space in the upper part of the tank, the water arresting and holding the floating matter and impurities which the air contained before entering it, thus leaving the air perfectly pure as it rises above the water. As this is the most important feature in the process, if there is any doubt as to the complete purity of the air after passing the water in tank A, it would be best to introduce another exactly similar tank, with water between the tanks A and $A^1$, to give it a second washing before entering into the spirits in tank $A^2$. The action of the air-pump continuing, the air thus washed and purified is forced through the coil-pipe D in tank $A^1$, the steam therein warming it, as before described, and is again disseminated in the bottom of the spirits in the tank $A^2$, rising through it with force enough to give it the appearance of boiling, but in fact raising the temperature of the spirits very slightly, and after passing the spirits the air is again driven through the water in the tanks $A^3$ and $A^4$, thence escaping through the pipe G.

The passage of the air through the spirits in the tank $A^2$ keeps the fluid in constant agitation, bringing every drop and particle of it in contact with the pure air, which takes up and carries forward into the water in the succeeding tanks the volatile oils and such other impurities as it is capable of taking up, together with a small percentage of the alcohol.

The water in the tanks $A^3$ and $A^4$ arrests and holds the alcohol and other matters brought by the air from the spirit, and the air passes the pipe G pure and sweet. The air, being divested of all impurities by the washing in tank A, carries nothing into the spirit, but leaves it loaded with such deleterious substances as new and raw spirits are known to contain; thus, after continuing the process a proper length of time, say from sixteen to twenty-four hours, leaving the spirit pure and wholesome, and mellowed and ripened as thoroughly as it would be by many years' keeping. The spirit in the tanks $A^3$ and $A^4$ can be saved by redistillation or other well-known processes, for mechanical or other purposes which it may be suitable for.

I am fully aware of the patent issued to Speed and Smith, July 15, 1862, and the process described and claimed therein, and the attempts to work under it, none of which proved successful because of the impurity of the air when introduced into the spirits and this process, and the apparatus which I have here described is an improvement upon that of Speed and Smith.

I do not claim anything described and claimed in Speed and Smith's patent; but

I do claim as new and my invention—

The improvement in the art of purifying or aging liquors herein set forth—that is to say, washing and purifying air, and then warming it before it is forced into the spirits, in the manner or substantially as described.

SULLIVAN SWEET, JR.

Witnesses:
CHAS. EUSTIS HUBBARD,
CHS. HOUGHTON.